US012561238B2

(12) United States Patent
Golez et al.

(10) Patent No.: US 12,561,238 B2
(45) Date of Patent: Feb. 24, 2026

(54) SYSTEMS, METHODS, AND MEDIA FOR TUNING SOLID-STATE DRIVES

(71) Applicant: SK hynix NAND Product Solutions Corp., Rancho Cordova, CA (US)

(72) Inventors: Mark Anthony Golez, Folsom, CA (US); Daniel Robert McLeran, Loveland, CO (US); Ryan Joseph Norton, Placerville, CA (US); Sarvesh Varakabe Gangadhar, Milpitas, CA (US); Holman Su, Sacramento, CA (US); Praveen Janga, Vancouver (CA); Lei Chen, San Jose, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 23 days.

(21) Appl. No.: 18/752,498

(22) Filed: Jun. 24, 2024

(65) Prior Publication Data

US 2025/0390430 A1 Dec. 25, 2025

(51) Int. Cl.
*G06F 12/02* (2006.01)

(52) U.S. Cl.
CPC ............................... *G06F 12/0246* (2013.01)

(58) Field of Classification Search
CPC .. G06F 12/0246; G06F 3/061; G06F 11/3409; G06F 30/27; G06F 18/217; G06F 8/443
USPC ....................... 711/103, 170, 12.007, 12.008
See application file for complete search history.

(56) References Cited

U.S. PATENT DOCUMENTS

| | | | | |
|---|---|---|---|---|
| 2021/0342730 | A1* | 11/2021 | Redmond | G06N 10/60 |
| 2021/0343406 | A1* | 11/2021 | McMillan | G06N 20/00 |
| 2022/0100254 | A1* | 3/2022 | Szurtei | G06F 1/3228 |
| 2022/0138613 | A1* | 5/2022 | Wardhan | G06N 5/01 |
| | | | | 706/12 |
| 2022/0413723 | A1 | 12/2022 | Thakkar et al. | |
| 2023/0333745 | A1* | 10/2023 | Chen | G06F 3/0659 |

(Continued)

FOREIGN PATENT DOCUMENTS

| | | |
|---|---|---|
| KR | 10-2019-0120698 | 10/2019 |
| KR | 10-2023-0123761 | 8/2023 |

OTHER PUBLICATIONS

International Search Report and Written Opinion dated Oct. 28, 2025 in International Patent Application No. PCT/US2025/034889, pp. 1-10.

(Continued)

*Primary Examiner* — Jared I Rutz
*Assistant Examiner* — Edward Waddy, Jr.
(74) *Attorney, Agent, or Firm* — Byrne Poh LLP

(57) ABSTRACT

Mechanisms, including systems, methods, and media, for tuning a solid-state drive (SSD) are provided, the mechanisms including: providing as an input to a first neural network (NN) current parameter settings (PSs) of the SSD; receiving as an output from the first NN at least one adjustment to the current PSs; based on the at least one adjustment, adjusting the current PSs of the SSD so that the SSD is using adjusted PSs; causing the SSD to execute a workload using the adjusted PSs; determining performance data of the SSD while executing the workload; determining a reward value based on the performance data; and back propagating the first NN based on the reward value.

24 Claims, 4 Drawing Sheets

(56) References Cited

U.S. PATENT DOCUMENTS

2024/0078264 A1* 3/2024 Solis ...................... G06N 7/01
2024/0094926 A1* 3/2024 Zhao .................... G06F 3/0625

OTHER PUBLICATIONS

Li, D., et al., "A Learning-Based Approach Towards Automated Tuning of SSD Configurations", In arXiv, Oct. 2021, pp. 1-15.

* cited by examiner

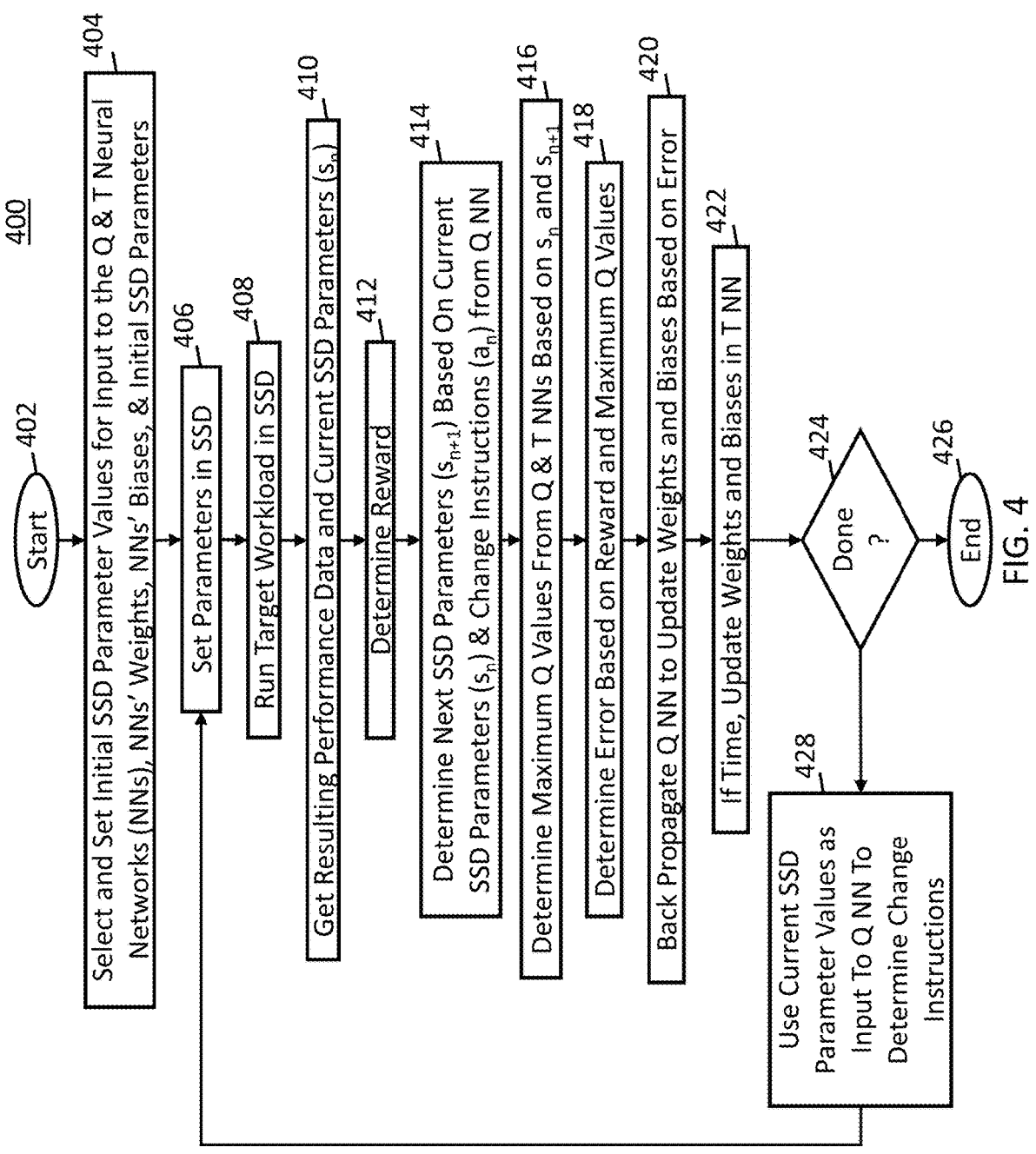

400

Start — 402

Select and Set Initial SSD Parameter Values for Input to the Q & T Neural Networks (NNs), NNs' Weights, NNs' Biases, & Initial SSD Parameters — 404

Set Parameters in SSD — 406

Run Target Workload in SSD — 408

Get Resulting Performance Data and Current SSD Parameters ($s_n$) — 410

Determine Reward — 412

Determine Next SSD Parameters ($s_{n+1}$) Based On Current SSD Parameters ($s_n$) & Change Instructions ($a_n$) from Q NN — 414

Determine Maximum Q Values From Q & T NNs Based on $s_n$ and $s_{n+1}$ — 416

Determine Error Based on Reward and Maximum Q Values — 418

Back Propagate Q NN to Update Weights and Biases Based on Error — 420

If Time, Update Weights and Biases in T NN — 422

Done ? — 424

End — 426

Use Current SSD Parameter Values as Input To Q NN To Determine Change Instructions — 428

FIG. 4

SYSTEMS, METHODS, AND MEDIA FOR TUNING SOLID-STATE DRIVES

BACKGROUND

Solid-State Drive (SSD) tuning is a resource intensive and manual process in the SSD product life cycle that has historically taken at least one quarter, at least two engineers, and at least one machine for each target SKU. In addition, since the process is manual and time consuming, solution space exploration is limited by schedule and the engineers' domain knowledge. This leads to local maximums which may not necessarily be the global maximum or best the system is capable of.

Accordingly, new mechanisms for tuning solid-state drives are desirable.

SUMMARY OF THE INVENTION

In accordance with embodiment some embodiments, mechanisms, including systems, methods and media for tuning solid-state drives are provided.

In some embodiments, systems for tuning a solid-state drive (SSD) are provided, the systems comprising: memory; and at least one hardware processor that is collectively configured to at least: (a) provide as an input to a first neural network current parameter settings of the SSD; (b) receive as an output from the first neural network at least one adjustment to the current parameter settings; (c) based on the at least one adjustment, adjust the current parameter settings of the SSD so that the SSD is using adjusted parameter settings; (d) cause the SSD to execute a workload using the adjusted parameter settings; (e) determine performance data of the SSD while executing the workload; (f) determine a reward value based on the performance data; and (g) back propagate the first neural network based on the reward value. In some of these embodiments, the at least one hardware processor is further collectively configured to at least: (h) provide as an input to a second neural network next parameter settings of the SSD, wherein the next parameter settings are determined based on the current parameter settings and the at least one adjustment; and (i) determine an error optimization value based on the reward value and outputs of the first neural network and the second neural network, wherein the back propagation is based on the error optimization value. In some of these embodiments, the at least one hardware processor is further collectively configured to at least: perform (a), (b), (c), (d), (e), (f), (g), (h), and (i) repeatedly over a number of iterations; and copy weights and biases from the first neural network to the second neural network after a given number of the iterations. In some of these embodiments, the neural network is a deep-Q neural network. In some of these embodiments, the performance data includes at least one of input-output operations per second (IOPS), quality of service, and IOPS stability. In some of these embodiments, the neural network includes a plurality of output nodes and each of the plurality of output nodes corresponds to an action to be taken on a parameter of the SSD. In some of these embodiments, the action is one of to increase the parameter by at least one, to decrease the parameter by at least one, and to leave the parameter unchanged. In some of these embodiments, the first neural network is initialized with previously determined, non-random weights and biases.

In some embodiments, methods for tuning a solid-state drive (SSD) are provided, the methods comprising: (a) providing as an input to a first neural network current parameter settings of the SSD; (b) receiving as an output from the first neural network at least one adjustment to the current parameter settings; (c) based on the at least one adjustment, adjusting the current parameter settings of the SSD so that the SSD is using adjusted parameter settings; (d) causing the SSD to execute a workload using the adjusted parameter settings; (e) determining performance data of the SSD while executing the workload; (f) determining a reward value based on the performance data; and (g) back propagating the first neural network based on the reward value. In some of these embodiments, the methods further comprise: (h) providing as an input to a second neural network next parameter settings of the SSD, wherein the next parameter settings are determined based on the current parameter settings and the at least one adjustment; and (i) determining an error optimization value based on the reward value and outputs of the first neural network and the second neural network, wherein the back propagation is based on the error optimization value. In some of these embodiments, the methods further comprise: perform (a), (b), (c), (d), (e), (f), (g), (h), and (i) repeatedly over a number of iterations; and copy weights and biases from the first neural network to the second neural network after a given number of the iterations. In some of these embodiments, the neural network is a deep-Q neural network. In some of these embodiments, the performance data includes at least one of input-output operations per second (IOPS), quality of service, and IOPS stability. In some of these embodiments, the neural network includes a plurality of output nodes and each of the plurality of output nodes corresponds to an action to be taken on a parameter of the SSD. In some of these embodiments, the action is one of to increase the parameter by at least one, to decrease the parameter by at least one, and to leave the parameter unchanged. In some of these embodiments, the first neural network is initialized with previously determined, non-random weights and biases.

In some embodiments, non-transitory computer-readable media containing computer executable instructions that, when executed by a processor, cause the processor to perform a method for tuning a solid-state drive (SSD) are provided, the method comprising: (a) providing as an input to a first neural network current parameter settings of the SSD; (b) receiving as an output from the first neural network at least one adjustment to the current parameter settings; (c) based on the at least one adjustment, adjusting the current parameter settings of the SSD so that the SSD is using adjusted parameter settings; (d) causing the SSD to execute a workload using the adjusted parameter settings; (e) determining performance data of the SSD while executing the workload; (f) determining a reward value based on the performance data; and (g) back propagating the first neural network based on the reward value. In some of these embodiments, the method further comprises: (h) providing as an input to a second neural network next parameter settings of the SSD, wherein the next parameter settings are determined based on the current parameter settings and the at least one adjustment; and (i) determining an error optimization value based on the reward value and outputs of the first neural network and the second neural network, wherein the back propagation is based on the error optimization value. In some of these embodiments, the method further comprises: performing (a), (b), (c), (d), (e), (f), (g), (h), and (i) repeatedly over a number of iterations; and copying weights and biases from the first neural network to the second neural network after a given number of the iterations. In some of these embodiments, the neural network is a deep-Q neural network. In some of these embodiments, the performance data includes at least one of input-output operations per second (IOPS), quality of service, and IOPS stability. In some of these embodiments, the neural network includes a plurality of output nodes and each of the plurality of output nodes corresponds to an action to be taken on a parameter of the SSD. In some of these embodiments, the action is one of to increase the parameter by at least one, to decrease the parameter by at least one, and to leave the parameter unchanged. In some of these embodiments, the first neural network is initialized with previously determined, non-random weights and biases.

BRIEF DESCRIPTION OF THE DRAWINGS

FIG. 4 is a flow diagram of an example process that can be used for tuning an SSD in some embodiments.

DETAILED DESCRIPTION

In accordance with some embodiments, mechanisms, including systems, methods and media for tuning solid-state drives are provided.

In some embodiment, a reinforcement learning agent can be used to train an SSD. In some embodiments, the reinforcement learning agent can be a deep-Q neural network reinforcement learning agent.

In some embodiments, the agent can run in an environment (either inside or outside the SSD) that has access to the state of the environment (e.g., current input-output operations per second (IOPS) and quality of service (QOS) for a workload) and uses a reward function to grade the quality of actions taken by the agent. Results of the reward function are back propagated to a neural network to allow the agent to learn over time, in some embodiments.

By using an agent, the SSD tuning process can be automated, in some embodiments. By automating the SSD tuning process, a better tune can be achieved since the tuning can happen more quickly and thoroughly.

Figure 1:
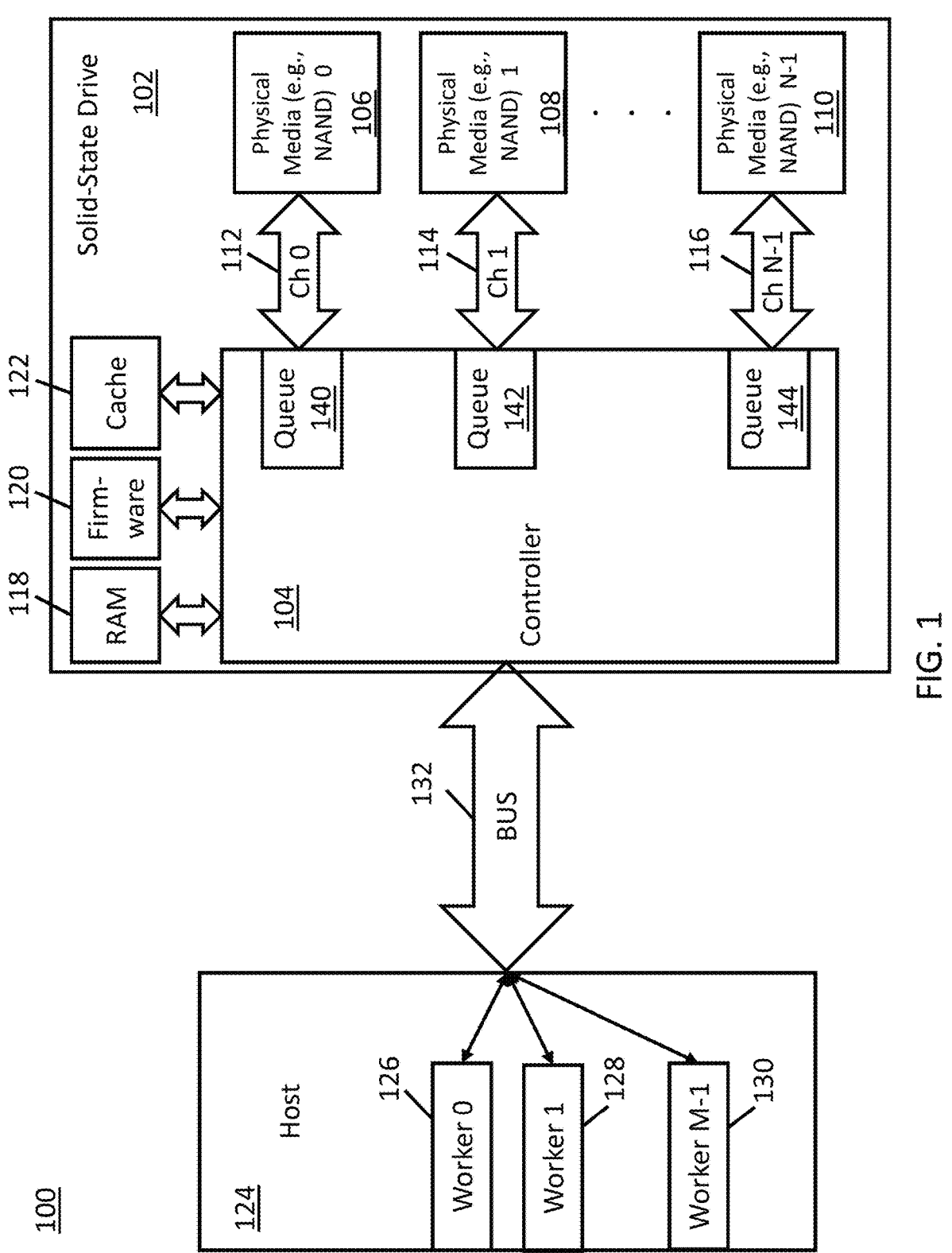
FIG. 1 is a block diagram of example hardware that can be used for tuning an SSD in some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, physical media (e.g., NAND devices) 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor (s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc. In some embodiments, controller 104 can be coupled to, or include (as shown), channel queues 140, 142, and 144 for transmitting commands (which can include command data) over channels 140, 142, and 144 to physical media 106, 108, and 110, respectively.

Physical media 106, 108, and 110 can be any suitable physical media for storing information (which can include data, programs, and/or any other suitable information that can be stored in a solid-state drive) in some embodiments. For example, the physical media can be NAND devices in some embodiments.

The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media (such as single-level cell (SLC) NAND devices, multilevel cell (MLC) NAND devices, triple-level cell (TLC) NAND devices, quad-level cell (QLC) NAND devices, penta-level cell (PLC) NAND, NAND with suitable levels of cells, 2D NAND devices, 3D NAND devices, NOR flash memory, any other suitable flash technology, phase change memory technology, and/or other any other suitable volatile and/or non-volatile memory storage technology) can be used in some embodiments. Each physical media can have any suitable size in some embodiments. While physical media 106, 108, and 110 can be implemented using NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
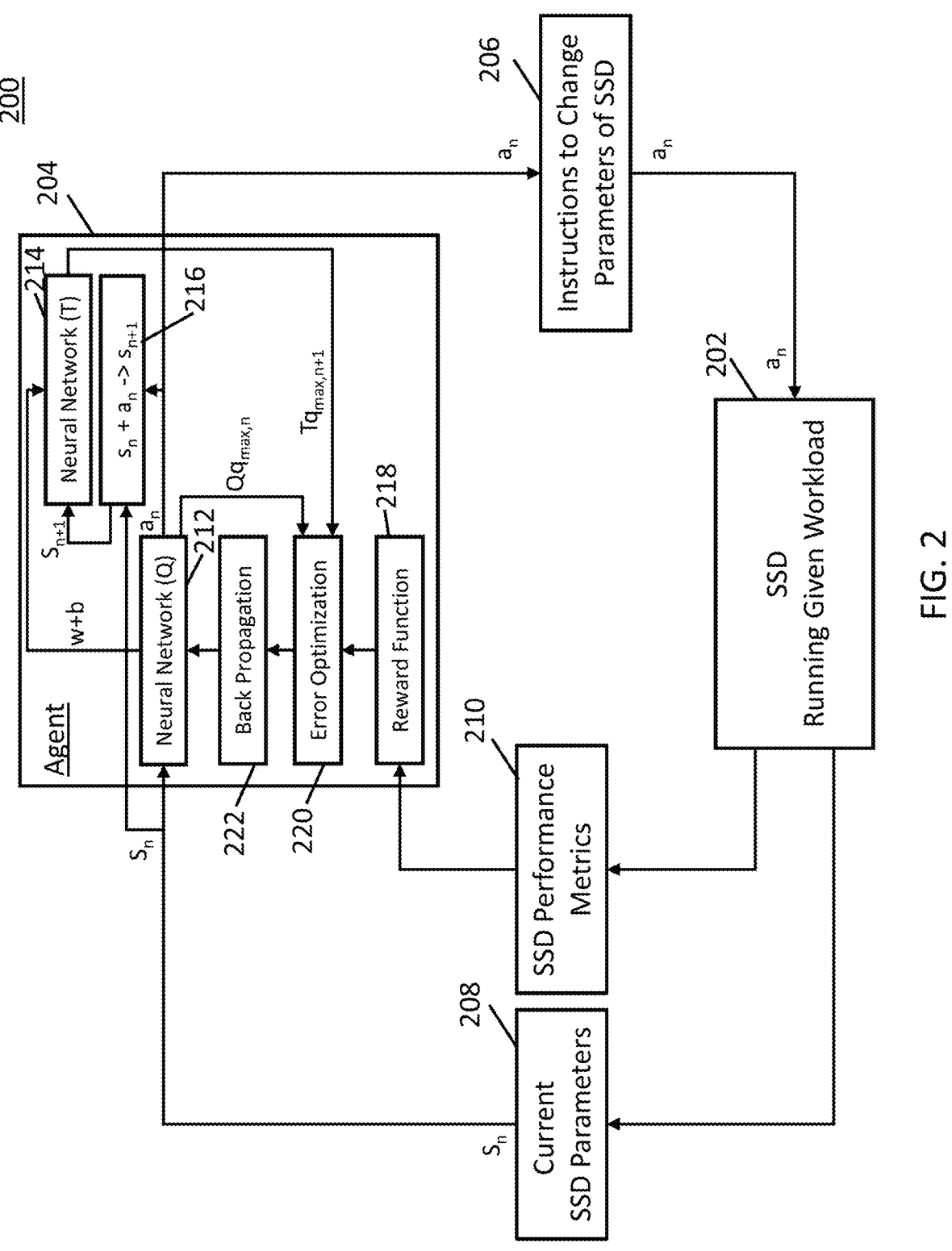
FIG. 2 is a block diagram of an example architecture for tuning an SSD in some embodiments.

Turning to FIG. 2, an example 200 of an architecture for tuning an SSD in accordance with some embodiments is shown. As illustrated, architecture 200 includes an SSD 202 and an agent 204. SSD 200 can be implemented using SSD 102 of FIG. 1, in some embodiments. In some embodiments, agent 204 can be implemented in controller 104 of SSD 102 of FIG. 1 or in host 124 of FIG. 1.

During operation, the agent issues instructions ($a_n$) 206 to change parameters of the SSD, the SSD then runs a workload, current parameters ($s_n$) 208 and performance metrics 210 are provided from the SSD to the agent, the agent learns from the current parameters and the performance metrics, and then the agent generates new instructions 206 to change parameters of the SSD and the process repeats. As the agent learns, it better identifies the best SSD parameters for the given workload.

In some embodiments, the agent can implement a deep-Q neural network. In doing so, as shown in FIG. 2, two neural networks Q 212 and T 214 can be implemented in the agent, in some embodiments. Neural network Q 212 can implement a policy network, in some embodiments, and neural network T 214 can implement a target network, in some embodiments. These neural networks can have an identical structure and can have weights and biases (w+b in the figure) that are periodically synchronized, in some embodiments.

Neural network Q 212 can receive current parameters ($s_n$) 208 as inputs and output instructions ($a_n$) 206, in some embodiments. This neural network can also output a maximum q value $Qq_{max,n}$ for the current parameters.

Based on current parameters ($s_n$) 208 and output instructions ($a_n$) 206, next parameters ($s_{n+1}$) can be determined by block 216, in some embodiments. The next parameters ($s_{n+1}$) can then be input to neural network T 214. This neural network output a maximum q value $Tq_{max,n}$ for the next parameters.

A reward function 218 in the agent receives performance metrics 210 from the SSD and generates one or more reward values, in some embodiments. Any suitable reward function can be used in some embodiments.

For example, in some embodiments, the reward function can be used to rate the quality of actions taken by the agent. More particularly, in this example, a simple reward function such as "If QoS and IOPS improved, the reward equals one, otherwise the reward equals zero" can be used for a small set of simple workloads such as 75% and 95% random read Queue Depth 1, in some embodiments.

As another example, in some embodiments, for more complex sets of workloads such as 1-99% random read Queue Depth 1-256, a more complex reward function such as "Rt=((WQoS*normalizedQoS)<<16)+ (WIOPS*normalizedIOPS)" can be used. In this example, assume that: Rt is 32-bit; each output can result in a range of [0, (UINT16_MAX/4)]; each weight is in a range of [0, 4]; the upper 16 bits can contain a QoS reward; and the lower 16 bits can contain an IOPS reward, with no overlap, in some embodiments. In this example, QoS (being in the higher bits) is prioritized over IOPS (being in the lower bits), in some embodiments. In some embodiments, the QoS can be capped at a threshold to ensure that, once a QoS requirement is met, any additional reward improvement only comes in the IOPS reward (in lower bits).

Based on the reward value(s), the maximum q value $Qq_{max,n}$, and the maximum q value $Tq_{max,n}$, an error optimization function 220 can determine an error value. Any suitable error optimization function can be used in some embodiments. For example, in some embodiments, a mean square error (MSE) function can be used as the error optimization function in some embodiments.

Based on the error value, a back-propagation function 222 adjusts weights and biases in neural network Q 212. Then, based on current parameters ($s_n$) 208 provided to the neural network (with its newly adjusted weights and biases), the neural network generates new instructions 206 to change the parameters of the SSD so that the workload can be run again. Any suitable back-propagation function can be used in some embodiments. For example, in some embodiments, a stochastic gradient descent function can be used.

As noted above, the weights and biases from neural network Q 212 can be periodically copied to neural network T 214. This copying can be performed at any suitable frequency. For example, in some embodiments, this copying can be performed after each 10% of the training cycles (e.g., if 100,000 training cycles, then copying can be performed after each 10,000 training cycles).

In this way, the agent repeatedly tunes the SSD until the best parameter settings can be found for the given workload.

Any suitable parameters of the SSD can be controlled by the agent using instructions 206 and can be received as inputs 208 to the agent, in some embodiments. For example, in some embodiments, the following parameters of an SSD can be controlled by the agent using instructions 206 and can be received as inputs 208 to the agent:

| # | Tuning Parameter | Description | Example Min | Example Max |
|---|---|---|---|---|
| 1 | MAX_READ_FORWARDED_DURING_PROGRAM_SUSPEND | Maximum limit on how many reads would be allowed once a Program command is suspended | 0 | 200 |
| 2 | MAX_READ_FORWARDED_DURING_ERASE_SUSPEND | Maximum limit on how many reads would be allowed once an Erase command is suspended | 0 | 255 |

-continued

| # | Tuning Parameter | Description | Example Min | Example Max |
|---|---|---|---|---|
| 3 | MAX_ALLOWED_ SUSPEND_FOR_ERASE | Maximum limit on number of suspends allowed per Erase command | 0 | 60 |
| 4 | MAX_ALLOWED_ SUSPEND_FOR_PROGRAM | Maximum limit on number of suspends allowed per program command | 0 | count until it reaches limit of 18 ms |
| 5 | MIN_TIME_FORWARD_ PROGRESS_DURING_ ERASE_SUSPEND | Minimum forward progress allowed for an ERASE before suspending, wherein forward progress is allowing a command to continue for an amount of time to make sure the command progresses | 0 | ERASE_SUSPEND_ TBERS_MAX_TIME |
| 6 | MAX_TIME_FORWARD_ PROGRESS_DURING_ ERASE_SUSPEND | Maximum forward progress allowed for an ERASE before suspending, wherein forward progress is allowing a command to continue for an amount of time to make sure the command progresses | 1150 | 5000 |
| 7 | MIN_TIME_FORWARD_ PROGRESS_FOR_FIRST_ PROGRAM_SUSPEND | Minimum forward progress allowed for a program before suspending for the first suspend, wherein forward progress is allowing a command to continue for an amount of time to make sure the command progresses | 0 | PROGRAM_SUSPEND_ TPROG_MIN_TIME |
| 8 | MIN_TIME_FORWARD_ PROGRESS_DURING_ PROGRAM_SUSPEND | Minimum forward progress allowed for a program before suspending, wherein forward progress is allowing a command to continue for an amount of time to make sure the command progresses | 250 | TPROG_TIME |
| 9 | ENABLE_FORWARD_ PROGRESS_THRESHOLD_ FOR_PROGRAM_SUSPEND | A threshold number of program suspends after which the amount of "program forward progress" that NAND media guarantees each time a program is suspended by a read (for read QoS purposes) is increased. | 0 | 10 |
| 10 | INTERNAL_READ_BUDGET | Maximum number of Garbage collection reads (internal read) allowed at a time to be in flight | 1 | MAX_DIE |
| 11 | CMD_COMPLETION_ POLLING_TIMER_ FOR_PROGRAM | Command polling timer for PROGRAM | TPROG_ MIN | TPROG_MAX |
| 12 | CMD_COMPLETION_ POLLING_TIMER_FOR_ERASE | Command polling timer for ERASE | TBERS_ MIN | TBERS_MAX |
| 13 | ADDITIONAL_CMD_ DELAY_FOR_READ | Amount of delay added to Read commands to slow them down | 0 | Target_latency |
| 14 | ADDITIONAL_CMD_ DELAY_FOR_WRITE | Amount of delay added to Write commands to slow them down | 0 | Target_latency |
| 15 | CMD_COMPLETION_ POLLING_TIMER_FOR_READ | Command polling timer for READ | 1 us | MIN_TREAD to MAX_TREAD |

Any suitable performance metric(s) can be monitored by the agent in some embodiments. For example, in some embodiments, the agent can monitor input/output operations per second (IOPS), quality of service (QOS), IOPS stability, and/or any other suitable performance characteristic, in some embodiments. When used, IOPS stability can be measured by minimum IOPS divided by average IOPS, by percentage of input/output operations that are within a given percentage (e.g., 2%, 5%, etc.) from the average IOPS, in some embodiments.

For each parameter, there can be any suitable number of actions that can be taken, in some embodiments. For example, in some embodiments, there can be three actions: (1) increase the value by 1 (or any other suitable value); (2) decrease the value by 1 (or any other suitable value); and (3) do not change the value. For a given parameter, Kn, these actions can be represented as Kn[+1], Kn[−1], and Kn[0], respectively. If there are 15 parameters (as shown in the table above), and there are three possible actions for each parameter, then there can be $3^{15}$ (14,348,907) possible combinations of parameter settings, in some embodiments.

In some embodiments, actions are bounded such that they do not violate any firmware or NAND policies. For example, in some embodiments, MAX_READ_COUNT_PER_SUS-PEND_FOR_PROGRAM shall not exceed a value that allows the program suspend time to exceed NAND data sheet. In some embodiments, actions are stored persistently in the SSD (via test command if agent running outside of SSD) per tuning run.

Each SSD parameter can be represented as a value from 0 to 1, in some embodiments. For example, in some embodiments, if a parameter has values from 1 to 10, the parameter can be represented as 0.1, 0.2, 0.3, . . . , 1.0.

Figure 3:
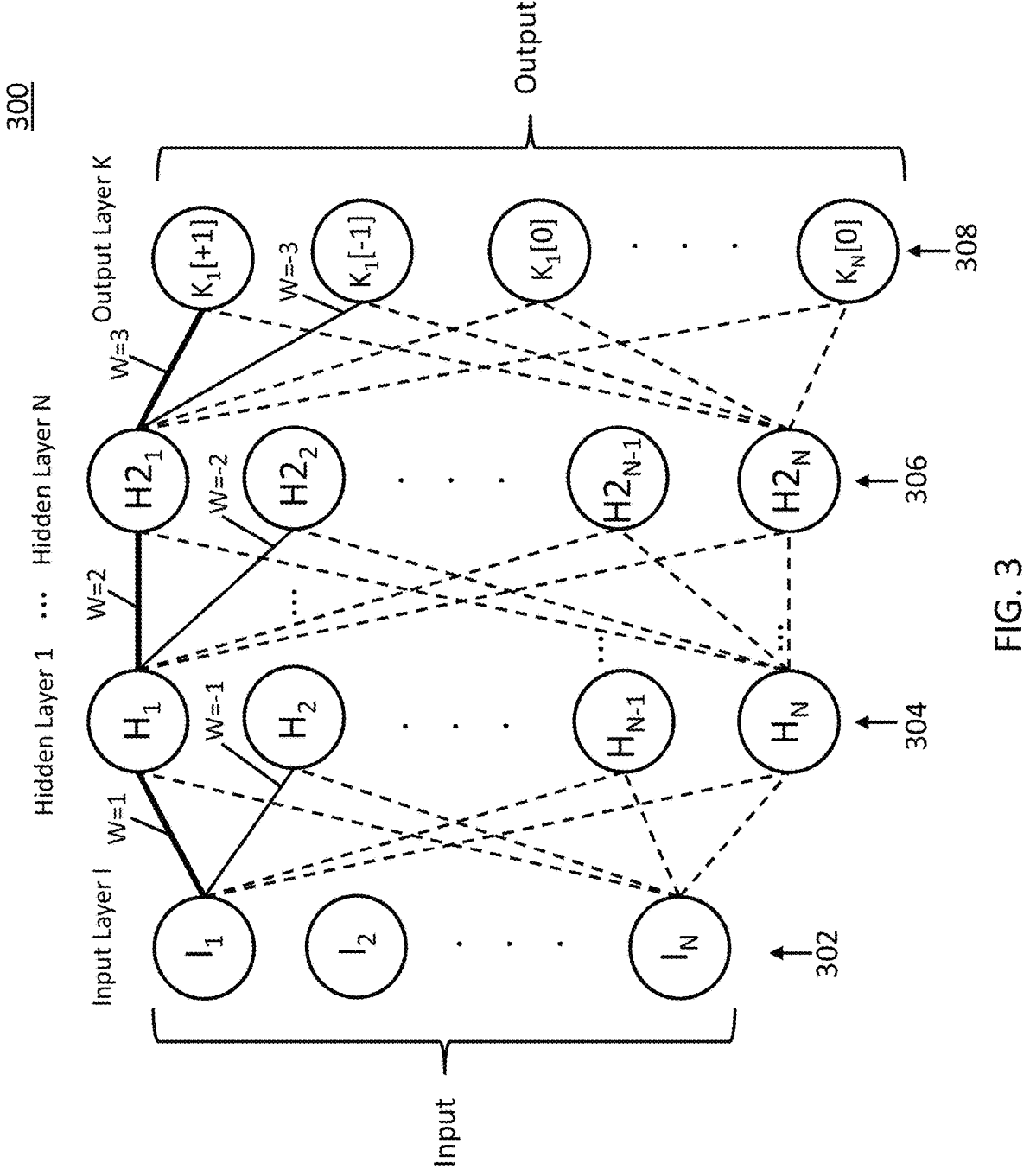
FIG. 3 is a diagram of an example neural network that can be used for tuning an SSD in some embodiments.

FIG. 3 illustrates an example 300 of a neural network (NN) that can be used in agent 204 as each of neural networks 212 and 214 in accordance with some embodiments. As shown, NN 300 can include an input layer 302, two hidden layers 304 and 306, and an output layer 308, in some embodiments.

In some embodiments, fewer or more than two hidden layers can be provided, in some embodiments.

As shown, each node of all layers but the output layer can have a connection to each node of the next layer (when going from left to right in the figure), in some embodiments. Each connection can have an associated weight, in some embodiments. In some embodiments, each weight can have a positive value if the node to the left of the connection excites the node to the right of the connection, and the weight can have a negative value if the node to the left of the connection suppresses the node to the right of the connection, in some embodiments. In some embodiments, rather than being positive or negative values, the weights can have values between 0 and 1.

Each layer can include any suitable number of nodes in some embodiments.

In some embodiments, when used to implement neural network 212, the nodes of the input layer hold the current parameters settings of the SSD. In some embodiments, when used to implement neural network 214, the nodes of the input layer hold the next parameters settings of the SSD.

In some embodiments, the hidden layer(s) and the output layer can have any suitable activation function and the activation function can be the same or different for different layers. For example, in some embodiments, a sigmoid activation function, a soft max activation function, a hyperbolic tangent (tanh) activation function, a Relu activation function, a Leaky Relu activation function, or any other suitable activation function can be used.

In some embodiments, the neural network can include any one or more biases.

It should be understood that, for the sake of clarity, FIG. 3 does not show all of the nodes, all of the connections, and all of the weights of the illustrated neural network.

Turning to FIG. 4, an example 400 of a process for tuning an SSD in accordance with some embodiments is shown. As illustrated, after process 400 starts at 402, the process can select and set initial SSD parameter values for input to the Q and T neural networks, the neural networks' weights and biases, and initial SSD parameters at 404. Any suitable parameter values, any suitable weights and biases, and any suitable SSD parameters can be selected and set, in some embodiments. For example, in some embodiments, the parameter values, weights, biases, and SSD parameters can be selected randomly, or pseudo randomly. As another example, in some embodiments, previously determined values and weights can be used.

Next, at 406, process 400 can set the parameters in the SSD. For the initial instance of 406, this can be the initial SSD parameters selected at 404. For subsequent instances of 406, this can be based on the output of the Q neural network. This can be performed in any suitable manner in some embodiments. For example, when process 400 is executing in a host, the parameters can be set by the host issuing a suitable command to the SSD, in some embodiments.

Then, at 408, process 400 can run a target workload in the SSD. Any suitable target workload can be run at 408, and the workload can be run in any suitable manner. For example, process 400 can cause a set of data to be written to a portion of the SSD, in some embodiments. As another example, in some embodiments, process 400 can cause a set of data to be read from a portion of the SSD.

At 410, process 400 can get the resulting performance data from the SSD and the current SSD parameters ($s_n$). Any suitable data, such as IOPS and/or QoS, can be received as the performance data in any suitable manner in some embodiments.

Next, at 412, process 400 can determine a reward value based on the performance data. Any suitable reward value can be determined in any suitable manner, in some embodiments. For example, in some embodiments, the reward value can be determined as described above in connection with FIG. 2.

Then, at 414, process 400 can determine the next SSD parameters ($s_{n+1}$) based on the current SSD parameters ($s_n$) and change instructions ($a_n$) from the Q neural network.

At 416, process can 400 can next determine the maximum q values from the Q and T neural networks based on $s_n$ and $s_{n+1}$. This determination can be made in an suitable manner.

Next, at 418, process 400 can determine the error based on the reward determined at 412 and the maximum q values determined at 416. As noted above, any suitable error function can be used to determine the error.

Then, at 420, process 400 can back propagate the Q neural network to update one or more of the neural network's weights and biases based on the error determined at 418. This back propagation can be performed in any suitable manner in some embodiments.

At 422, if it is time to do so, process 400 can update the weights and biases in the T neural network to match the weights and biases in the Q neural network. As noted above, this updating can be performed at any suitable frequency.

Next, at 424, process 400 can next determine if it is done. This determination can be made in any suitable manner in some embodiments. For example, in some embodiments, process 400 can determine that it is done when a target IOPS and/or QoS is reached. As another example, in some embodiments, process 400 can determine that it is done when a threshold level of reward value has been determined at 412. As yet another example, in some embodiments, process 400 can determine that it is done when the parameter values stabilize or substantially stabilize.

If it is determined at 424 that process 400 is done, then the process can end at 426. Otherwise, if it is determined that at 424 that process 400 is not done, then the process can branch to 428 at which it can use the current SSD parameter values as input to the Q neural network and then loop back to 406 and proceed as described above.

In some embodiments, at least some of the above-described blocks of the process of FIG. 4 can be executed or performed in any order or sequence not limited to the order and sequence shown in and described in connection with the figure. Also, some of the above blocks of the process of FIG. 4 can be executed or performed substantially simultaneously where appropriate or in parallel to reduce latency and processing times in some embodiments. Additionally or alternatively, some of the above described blocks of the process of FIG. 4 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for tuning SSDs are provided. These mechanisms improve the performance of SSDs by tuning them to match a target workload.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for tuning a solid-state drive (SSD), comprising:
    memory; and
    at least one hardware processor that is collectively configured to at least:
        (a) provide as an input to a first neural network current parameter settings of the SSD;
        (b) receive as an output from the first neural network at least one adjustment to the current parameter settings;
        (c) based on the at least one adjustment, adjust the current parameter settings of the SSD so that the SSD is using adjusted parameter settings;
        (d) cause the SSD to execute a workload using the adjusted parameter settings;
        (e) determine performance data of the SSD while executing the workload;
        (f) determine a reward value based on the performance data;
        (g) back propagate the first neural network based on the reward value;
        (h) provide as an input to a second neural network next parameter settings of the SSD, wherein the next parameter settings are determined based on the current parameter settings and the at least one adjustment; and
        (i) determine an error optimization value based on the reward value and outputs of the first neural network and the second neural network,
        wherein the back propagation is based on the error optimization value.

2. The system of claim 1, wherein the at least one hardware processor is further collectively configured to at least:
    perform (a), (b), (c), (d), (e), (f), (g), (h), and (i) repeatedly over a number of iterations; and
    copy weights and biases from the first neural network to the second neural network after a given number of the iterations.

3. The system of claim 1, wherein the first neural network is a deep-Q neural network.

4. The system of claim 1, wherein the performance data includes at least one of input-output operations per second (IOPS), quality of service, and IOPS stability.

5. The system of claim 1, wherein the first neural network includes a plurality of output nodes and each of the plurality of output nodes corresponds to an action to be taken on a parameter of the SSD.

6. The system of claim 5, wherein the action is one of to increase the parameter by at least one, to decrease the parameter by at least one, and to leave the parameter unchanged.

7. The system of claim 1, wherein the first neural network is initialized with previously determined, non-random weights and biases.

8. The system of claim 1, wherein the first neural network implements a policy network, and wherein the second neural network implements a target network.

9. A method for tuning a solid-state drive (SSD), comprising:

(a) providing as an input to a first neural network current parameter settings of the SSD;

(b) receiving as an output from the first neural network at least one adjustment to the current parameter settings;

(c) based on the at least one adjustment, adjusting the current parameter settings of the SSD so that the SSD is using adjusted parameter settings;

(d) causing the SSD to execute a workload using the adjusted parameter settings;

(e) determining performance data of the SSD while executing the workload;

(f) determining a reward value based on the performance data; and (g) back propagating the first neural network based on the reward value;

(h) providing as an input to a second neural network next parameter settings of the SSD, wherein the next parameter settings are determined based on the current parameter settings and the at least one adjustment; and (i) determining an error optimization value based on the reward value and outputs of the first neural network and the second neural network, wherein the back propagation is based on the error optimization value.

10. The method of claim 2, further comprising:

perform (a), (b), (c), (d), (e), (f), (g), (h), and (i) repeatedly over a number of iterations; and copy weights and biases from the first neural network to the second neural network after a given number of the iterations.

11. The method of claim 9, wherein the first neural network is a deep-Q neural network.

12. The method of claim 9, wherein the performance data includes at least one of input-output operations per second (IOPS), quality of service, and IOPS stability.

13. The method of claim 9, wherein the first neural network includes a plurality of output nodes and each of the plurality of output nodes corresponds to an action to be taken on a parameter of the SSD.

14. The method of claim 13, wherein the action is one of to increase the parameter by at least one, to decrease the parameter by at least one, and to leave the parameter unchanged.

15. The method of claim 9, wherein the first neural network is initialized with previously determined, non-random weights and biases.

16. The method of claim 9, wherein the first neural network implements a policy network, and wherein the second neural network implements a target network.

17. A non-transitory computer-readable medium containing computer executable instructions that, when executed by a processor, cause the processor to perform a method for tuning a solid-state drive (SSD), the method comprising:

(a) providing as an input to a first neural network current parameter settings of the SSD;

(b) receiving as an output from the first neural network at least one adjustment to the current parameter settings;

(c) based on the at least one adjustment, adjusting the current parameter settings of the SSD so that the SSD is using adjusted parameter settings;

(d) causing the SSD to execute a workload using the adjusted parameter settings;

(e) determining performance data of the SSD while executing the workload;

(f) determining a reward value based on the performance data; and (g) back propagating the first neural network based on the reward value;

(h) providing as an input to a second neural network next parameter settings of the SSD, wherein the next parameter settings are determined based on the current parameter settings and the at least one adjustment; and (i) determining an error optimization value based on the reward value and outputs of the first neural network and the second neural network, wherein the back propagation is based on the error optimization value.

18. The non-transitory computer-readable medium of claim 17, wherein the method further comprises:

perform (a), (b), (c), (d), (e), (f), (g), (h), and (i) repeatedly over a number of iterations; and copy weights and biases from the first neural network to the second neural network after a given number of the iterations.

19. The non-transitory computer-readable medium of claim 17, wherein the first neural network is a deep-Q neural network.

20. The non-transitory computer-readable medium of claim 17, wherein the performance data includes at least one of input-output operations per second (IOPS), quality of service, and IOPS stability.

21. The non-transitory computer-readable medium of claim 17, wherein the first neural network includes a plurality of output nodes and each of the plurality of output nodes corresponds to an action to be taken on a parameter of the SSD.

22. The non-transitory computer-readable medium of claim 21, wherein the action is one of to increase the parameter by at least one, to decrease the parameter by at least one, and to leave the parameter unchanged.

23. The non-transitory computer-readable medium of claim 17, wherein the first neural network is initialized with previously determined, non-random weights and biases.

24. The non-transitory computer-readable medium of claim 17, wherein the first neural network implements a policy network, and wherein the second neural network implements a target network.

* * * * *